United States Patent Office 3,432,512
Patented Mar. 11, 1969

3,432,512
CYANOALKYLATED HYDROXYALKYLATED POLYVINYL ALCOHOL AND DERIVATIVES
Benjamin D. Halpern, Jenkintown, Pa., assignor to The Borden Company, New York, N.Y., a corporation of New Jersey
No Drawing. Filed July 22, 1965, Ser. No. 474,176
U.S. Cl. 260—91.3
Int. Cl. C08f *3/34;* C08b *3/38, 1/92*
4 Claims

ABSTRACT OF THE DISCLOSURE

This invention relates to a polymeric compound which is prepared by reacting polyvinyl alcohol with an alkylene oxide and thereafter cyanoalkylating the primary alcohol group of the hydroxyalkylated alcohol.

---

This invention relates to the cyanoalkylation of hydroxyalkylated polyvinyl alcohol, the resulting product, and derivatives thereof.

The invention is particularly useful in making adhesives, surfactants, and intermediates for use in further chemical synthesis.

Cyanoethylation of polyvinyl alcohol has been known heretofore. The cyanoethylation occurs, with such materials, on secondary alcohol groups that may remain in the polymer and represent residues of the theoretical vinyl alcohol monomer, $CH_2=CHOH$.

In my cyanoalkylation of alkoxylated polyvinyl alcohol, on the other hand, I cyanoalkylate primary alcohol groups, $-C_nH_{2n}OH$. These groups undergo cyanoalkylation very readily, with modification to a large extent of the solubility and other properties and production of products susceptible to conversion to valuable derivatives.

Briefly stated, the invention comprises the herein described process and product of cyanoalkylating hydroxyalkylated polyvinyl alcohol and derivatives thereof such as those formed by converting the nitrile group in the product first formed to either carboxy or $-CH_2-NH_2$ groups.

The reactions in making the starting material, namely the hydroxyalkylated polyvinyl alcohol, treating it with the cyanoalkylating material (here an acrylonitrile type), and conversion of the nitrile groups in the reaction product to carboxy (or salt thereof) or to $-CH_2-NH_2$ are illustrated in simplified manner in the following equations:

(1) Hydroxyalkylation:

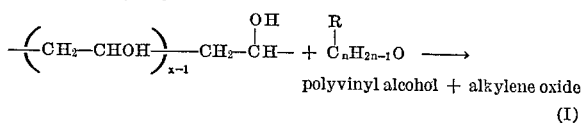
polyvinyl alcohol + alkylene oxide (I)

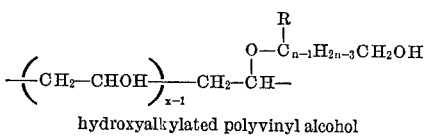
hydroxyalkylated polyvinyl alcohol (2) Cyanoalkylation of primary alcohol of (I):

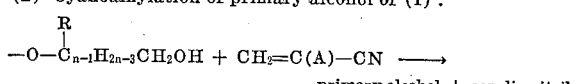
primary alcohol + acrylic nitrile

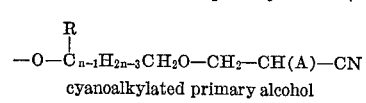 (II)
cyanoalkylated primary alcohol (3) Hydrolysis of nitrile group of (II):

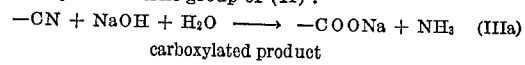 (IIIa)
carboxylated product (4) Hydrogenation of nitrile group of (II):

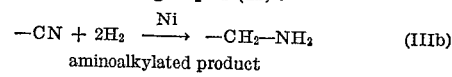 (IIIb)
aminoalkylated product

The products of the reaction may be written as:

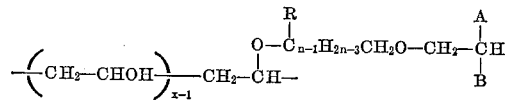

In the formulas above $x$ represents the number of vinyl alcohol residues and may be between about 3 and 225. $n$ is an integer in the range 2–4. R represents phenyl or hydrogen (H). A is hydrogen (H) or methyl ($-CH_3$), and B is ($-CN$) or carboxy ($-COOH$ or its salt such as $-COONa$) or $-CH_2NH_2$.

In effecting these reactions, usual conditions, such as the pH, temperature, and catalyst conventionally used for the type of reaction are established. Thus the reaction of the acrylonitrile in the cyanoethylation is conducted to advantage in a moderately alkaline medium as is also the hydrolysis of the nitrile so produced to the carboxy derivative, it being noted that the hydrolysis is ordinarily by sodium, potassium or other alkali metal hydroxide with the formation of the salt of the carboxy acid. Hydrolysis may also be accomplished in an acid medium. Likewise in the hydrogenation, there is used hydrogen with the Raney nickel type of catalyst or a hydride such as lithium boron hydride.

As to materials, the polyvinyl alcohol used is that resulting from the hydrolysis of polyvinyl acetate or like ester, as to the extent of about 85%–100% complete. To give the hydroxyalkylated product which is the starting point in the present reactions, the polyvinyl alcohol is hydroxyalkylated by combination with an oxide, such as ethylene, propylene, butylene and styrene oxide and suitably in contact with an alkaline catalyst such as triethanol amine or ammonia. Ordinarily ethylene oxide is preferred. The proportions by weight are about 5–100 parts of the oxide and usually about 10–40 parts, for 100 parts of the polyvinyl alcohol used and appearing as hydroxyalkyl and polyvinyl alcohol residues, respectively, in the product. I consider that the phenyl group, in the event styrene oxide is used, does not affect my definition of a hydroxyalkylating agent since it is not directly connected to the alcohol moiety of the hydroxyalkylated polyvinyl alcohol.

The nitrile used as a starting material is that of an alpha-unsaturated aliphatic monocarboxylic acid, as, for instance, acrylic and methacrylic acids, their nitriles being of the formula $CH_2=C(A)-CN$, A being H or $CH_3$.

As the catalyst of the cyanoalkylation there is used any water soluble alkali that is conventional as the catalyst for the cyanoalkylation of a hydroxy compound, examples being sodium, potassium, or lithium hydroxide, triethanol amine, trimethyl benzyl ammonium hydroxide, and ethylene diamine.

The proportion of the nitrile used may be varied, as from 2%–100% and usually 5%–40% of the acrylic nitrile of the weight of the hydroxyalkylated polyvinyl alcohol, any amount of nitrile not reacted being distilled away at the end from the cyanoalkylated product.

As to conditions, the hydroxyalkylated polyvinyl alcohol is used in either the solid powdered state or in solution or suspension in a liquid that is chemically inert to the starting materials, as for example, hexane or benzene. The selected acrylo- or methacrylonitrile is introduced, suitably as a slow stream or spray of the liquid, with constant stirring of the mass to provide distribution of the nitrile. The catalyst used may be that introduced previously as the alkaline catalyst initially in the hydroxyalkylation of the polyvinyl alcohol or more of the same or other catalyst if a catalyst was in fact used in the hydroxyalkylation step, or if none was used, catalyst of the kind described. Satisfactory and convenient to use for this cyanoalkylation is sodium or other alkali metal hydroxide in the amount of about 1%–5% of the weight of the hydroxyalkylated polyvinyl alcohol.

The reactants are stirred together in a closed vessel until there is no evidence of continuing chemical reaction. After this stage is reached the apparatus is opened to the atmosphere. If it is desired to remove unreacted acrylonitrile or suspending liquid, if any used, the volatile materials are distilled, e.g. at a temperature of up to about 120° C. under sub-atmospheric pressure if necessary, to remove the volatile materials substantially completely.

The invention will be further illustrated by the following specific examples, proportions here and elsewhere herein being expressed as parts by weight.

Example 1.—Cyanoalkylation

An aqueous solution is prepared in the cold of 10 parts of hydroxyethylated polyvinyl alcohol containing approximately 20% of the hydroxyethyl group and 2 parts of sodium hydroxide as catalyst in 100 parts of water. There are then admixed and dissolved 10 parts of acrylonitrile. The resulting solution is held at about 30° C. for an hour. At the end of that time the reaction is substantially completed. Phosphoric acid is then stirred in, in amount to neutralize the alkali catalyst, and the acrylonitrile which remains unreacted is removed by distillation.

The cyanoethylated hydroxyethylated polyvinyl alcohol that remains behind, when the distillation is completed is then separated by adding 300 parts of isopropanol. This precipitates the product.

The product of the cyanoethylation is either re-dissolved after the precipitation described or, alternatively, is used in the original solution resulting from adding the acid to neutralize the alkali, as an adhesive for paper, wood, and like products.

Example 2

Hydroxyethylated polyvinyl alcohol in powdered form is charged to a jacketed kneading mixer and blended in the amount of 100 parts with 40 parts of acrylonitrile. Additional acrylonitrile is added to a total equal in weight to that of the hydroxyethoxylated polyvinyl alcohol. Gaseous ammonia is then fed into the closed mixer to maintain a positive pressure. Mixing is continued for about one hour at a temperature of 28°–32° C. The outlet of the mixer is then connected to a condenser and a vacuum pump, hot water or steam is fed into the jacket of the mixer, vacuum is applied and the excess acrylonitrile and any other volatiles are distilled off. The residue is then purified by precipitation.

Example 3

The procedure of Example 1 is used except that said aqueous solution is composed of 10% of hydroxypropylated polyvinyl alcohol and 2 parts of sodium hydroxide for 100 parts of water. Into this 10 parts of acrylonitrile are introduced and operations continued as described in Example 1.

In a modification, the same procedure and composition are used except that the hydroxypropylated polyvinyl alcohol is replaced by an equal weight of hydroxybutylated polyvinyl alcohol.

Example 4.—Hydrolysis

The cyanoethylated hydroxyethylated polyvinyl alcohol in the form in which it exists in Example 1 before the addition of the phosphoric acid is boiled with sodium hydroxide in amount to provide a slight excess above 1 mol for each mol of the acrylonitrile combined. The whole is then heated as to 80° C. up to refluxing temperature until the alkalinity of the mixture ceases to fall and remains practically constant.

At this stage the nitrile group, —CN, is converted to the carboxy group in the form of the sodium salt —COONa. The salt so produced is useful as a surfactant in aqueous solutions.

This sodium salt, for some purposes, is then converted to the free carboxy form by the addition of dilute acid as, for instance, phosphoric acid or sulfuric acid in amount chemically equivalent to the sodium in the carboxy group. The resulting product has acidity due to the free carboxy group and is useful as an adhesive to be applied in aqueous solution to surfaces such as are attacked at least slightly by acidity, as for instance, in bonding aluminum or bronze foil or such foil to paper or wood.

In both the liquid and solid form, the acid and salt have ion exchange properties. The liquid may be rendered insoluble by cross-linking with a suitable agent for such reactions. Ion exchange membranes, useful in electrodialytic processes, can be obtained by making the carboxylated product into a film and subsequently removing the solvent. The physical properties are enhanced by cross-linking and curing.

Example 5.—Hydrogenation

Cyanoethylated hydroxyethylated polyvinyl alcohol representing the precipitated product from Example 1 is dissolved in water having therein about 1% of dry ammonia on the weight of the water. Raney nickel catalyst is then admixed and hydrogenation effected by introducing hydrogen under pressure, maintaining the temperature at about 70° C. and continuing the introduction of the hydrogen and reaction at the elevated temperature until the pressure of hydrogen in the system no longer ceases to fall when the introduction of additional hydrogen is temporarily discontinued.

The result of this reaction is the aminoethylated analog by conversion of the nitrile group to primary amine as illustrated in the last of the equations given above.

The product is useful as a detergent or surfactant either as a surfactant made before or after reaction of the amine group with a $C_{12}$–$C_{18}$ monocarboxylic fatty acid as, for example, lauric, oleic, or stearic acid or tall oil, in the proportion of about 0.5–1 mol of the acid for each amine group in the hydrogenated product. The product is also useful as a cationic surfactant by converting the amine to the quaternized form. It is also useful as an ion exchange material in physical forms above described in the quaternized and non-quaternized form.

Example 6

The composition of Example 1 is used except that the acrylonitrile is replaced by methacrylonitrile. In that example the aqueous solution first made contains 10 parts of the hydroxyethylated polyvinyl alcohol, 2 parts of sodium hydroxide, and 100 parts of water, into which there are admixed 10 parts of methacrylonitrile. The reaction, subsequent neutralization, and precipitation are effected as described in Example 1.

Example 7

Hydroxyethylated polyvinyl alcohol is prepared in the absence of a catalyst. The cyanoalkylated product is prepared as in Example 1 except that 3 parts by weight of potassium hydroxide for 10 parts of the hydroxyethylated polyvinyl alcohol is added to the reaction mixture.

It will be understood that it is intended to cover all changes and modifications of the example of the invention herein chosen for the purpose of illustration which do not constitute departures from the spirit and scope of the invention.

I claim:
1. A polymeric compound of the formula:

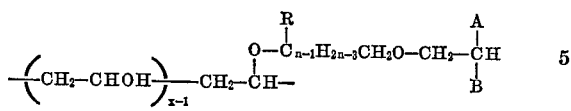

in which $x$ is the number of vinyl alcohol residues and is within the range between about 3–225, $n$ is an integer in the range 2–4, R is selected from the group consisting of phenyl and hydrogen, A is selected from the group consisting of hydrogen and methyl and B is selected from the group consisting of nitrile, carboxy and —$CH_2$—$NH_2$.

2. The compound of claim 1 in which B is the nitrile group, —CN.

3. The compound of claim 1 in which B is the group, —$CH_2$—$NH_2$.

4. The compound of claim 1 in which B is the carboxy group.

References Cited
UNITED STATES PATENTS

| | | | |
|---|---|---|---|
| 2,941,990 | 6/1960 | Schuller | 260—93.5 |
| 3,052,652 | 9/1962 | Halpern et al. | 260—73 |
| 3,194,798 | 7/1965 | Frost | 260—91.3 |

JOSEPH L. SCHOFER, *Primary Examiner.*

STANFORD M. LEVIN, *Assistant Examiner.*

U.S. Cl. X.R.

161—220; 252—152; 260—2.1